(12) United States Patent
Tong et al.

(10) Patent No.: US 6,462,458 B1
(45) Date of Patent: Oct. 8, 2002

(54) VENTILATED SERIES LOOP BLOCKS AND ASSOCIATED TIE METHODS

(75) Inventors: Wei Tong, Clifton Park, NY (US); Christian Lee Vandervort, Voorheesville, NY (US); William Hunter Boardman, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/840,465

(22) Filed: Apr. 24, 2001

(51) Int. Cl.[7] .............................. H02K 3/46; H02K 1/32; H02K 9/00
(52) U.S. Cl. ........................................................ 310/270
(58) Field of Search .............................. 310/52, 58, 59, 310/65, 270, 211; H02K 9/00

(56) References Cited

U.S. PATENT DOCUMENTS

| 2,980,757 | A | * | 4/1961 | Coggeshall | 310/52 |
| 3,437,859 | A | * | 4/1969 | Gibbs | 310/65 |
| 4,297,606 | A | * | 10/1981 | Wichmann | 174/138 E |
| 5,355,046 | A | * | 10/1994 | Weigelt | 310/721 |
| 5,869,912 | A | * | 2/1999 | Andrew et al. | 310/52 |

* cited by examiner

Primary Examiner—Nestor Ramirez
Assistant Examiner—Karen Addison
(74) Attorney, Agent, or Firm—Nixon & Vanderhye PC

(57) ABSTRACT

The series loop blocks of an armature end-winding structure are formed with grooves along a portion of their side surfaces to allow air flow to pass through the grooves to the series loop caps. Provision of the grooves on the side surfaces also facilitates machining of the ungrooved side surface portions of the series loop blocks for better fit and assembly between adjacent series loop caps.

11 Claims, 7 Drawing Sheets

VENTILATED SERIES LOOP BLOCKS AND ASSOCIATED TIE METHODS

BACKGROUND OF THE INVENTION

This invention relates to armature end-windings, and, more specifically, to the series loop blocks and associated tie methods in armature end-windings.

Cooling and ventilation are prime considerations in the design of electric turbomachines. Many of the benefits associated with improved reliability and increased power capability can be traced directly to improved thermal design. In a once-through ventilated hydrogen-cooled generator, the cooling gas from the ventilating fan is distributed into four branches: the gas gap between the rotor and stator, the rotor subslot, the outside space block, and through the end-winding (see FIG. 1). To cool the ends of armature bars near the series loop caps, the cooling gas passes through the gap between the edges of armature bars and the tip of the gas shell. Thus, in order to achieve a relatively uniform temperature distribution and to minimize ventilating windage losses, the cooling flow path must be optimized.

The end-winding support system restrains the movement of the sections of the armature bars that extend outside the core. In the support system, series loop blocks are used to reduce the operational deflections of the series loops at resonance and to withstand electromagnetic forces acting on the series loops. Series loops blocks may be required between every series loop or every other series loop, depending upon the generator type and the vibration characteristics. Two acceptable tie methods for series loop blocking are wrap & frap and X-tie & frap. As an example, a typical view of series loop blocking using X-tie & frap is shown in FIG. 2.

In FIG. 2, reference numeral 40 denotes series loops caps and reference numeral 42 denotes series loop blocks. Since the series loops caps 40 are circularly arranged, the sides of adjacent series loops caps 40 are not parallel to each other. Likewise, the side surfaces of the interposed series loop blocks 42 are not parallel to facilitate a tight fit. Typically, the side surfaces of each series loop block 42 are machined to the extent necessary to obtain a tight fit between the adjacent series loop caps. Alternatively, a build up of felt on the side surfaces of the series loop blocks 42 can be used to obtain a tight fit. In some instances, machining and built up felt is used on the side surfaces of the series loop blocks 42 to obtain a tight fit.

Series loop blocks 42 are conventionally made from solid textolite material, as shown in FIG. 3. Each series loop block 42 is wrapped or tied with resin impregnated felt (not shown). The thickness of the felt is chosen to ensure felt compression of 25% to 50% when the series loop block is installed. However, with installed solid series loop blocks 42, the gas flow path to the outward parts of the series loop caps 40 is blocked, leading to hot spots occurring on these uncooled portions of the winding.

BRIEF SUMMARY OF THE INVENTION

The present invention solves the above described problem by using series loop blocks which support the end-winding bars, improve series loop cooling and increase reliability and efficiency of block bonding. The series loop blocks are machined to include grooves on both sides so as to allow cooling gas to pass through the grooves. This configuration enhances heat transfer and cools series loop caps more efficiently, thereby eliminating hot spots at end-winding series loops.

By providing grooves in the sides of the series loop blocks, the contact areas between the blocks and series loop caps is greatly reduced. The reduction in contact surface area facilitates machining of block contact areas for easier and better fitting of the blocks between series loop caps.

As a consequence, the provision of the grooved series loop blocks increases the operational reliability of generators, by improving the cooling and reducing the vibration of the end-winding series loops. The time to fit and tie the blocks is also reduced resulting in overall winding cycle and cost reductions.

DETAILED DESCRIPTION OF THE INVENTION

Figure 4:
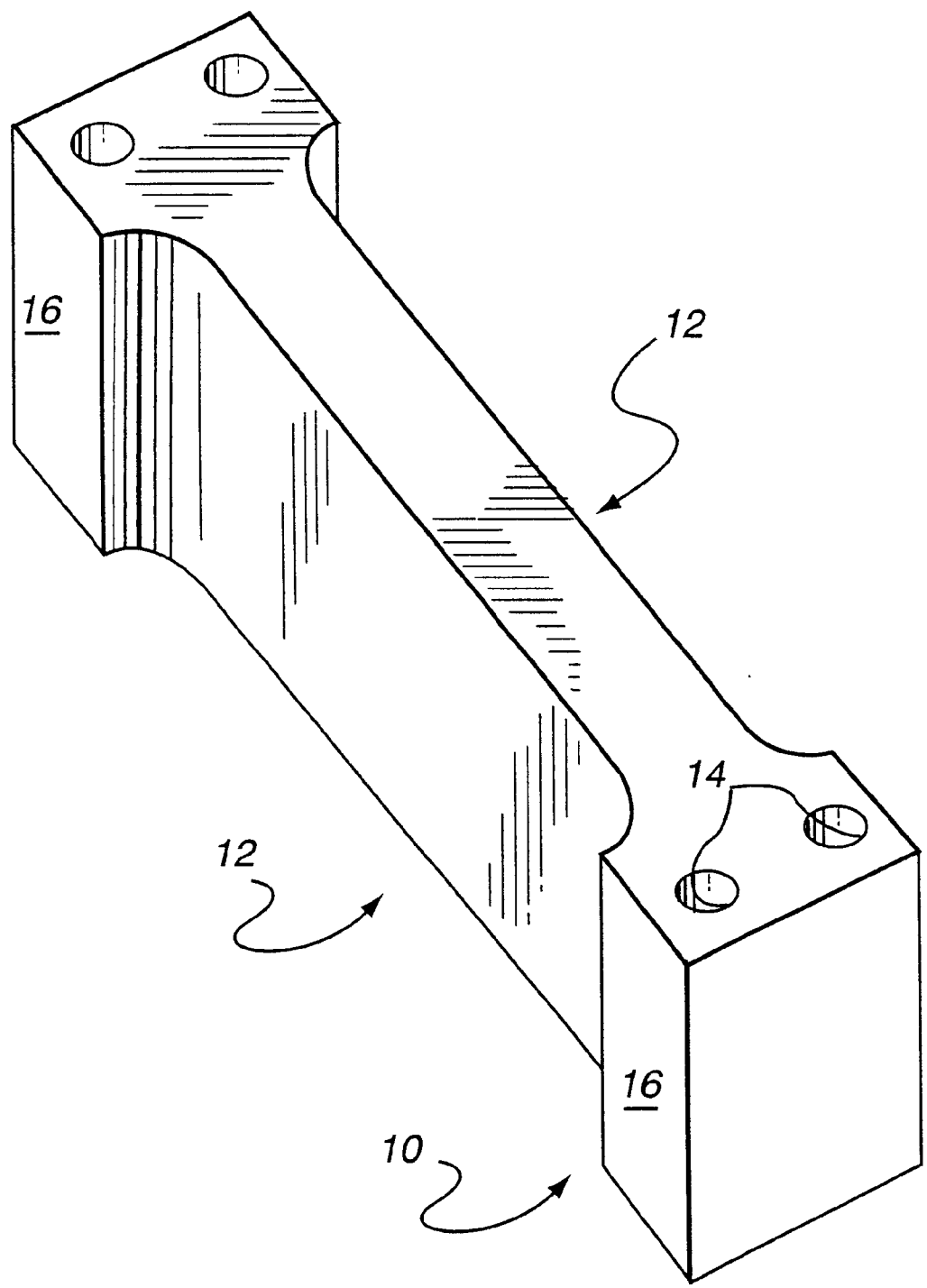
FIG. 4 is a perspective view of an exemplary embodiment of the present invention.
Figure 5:
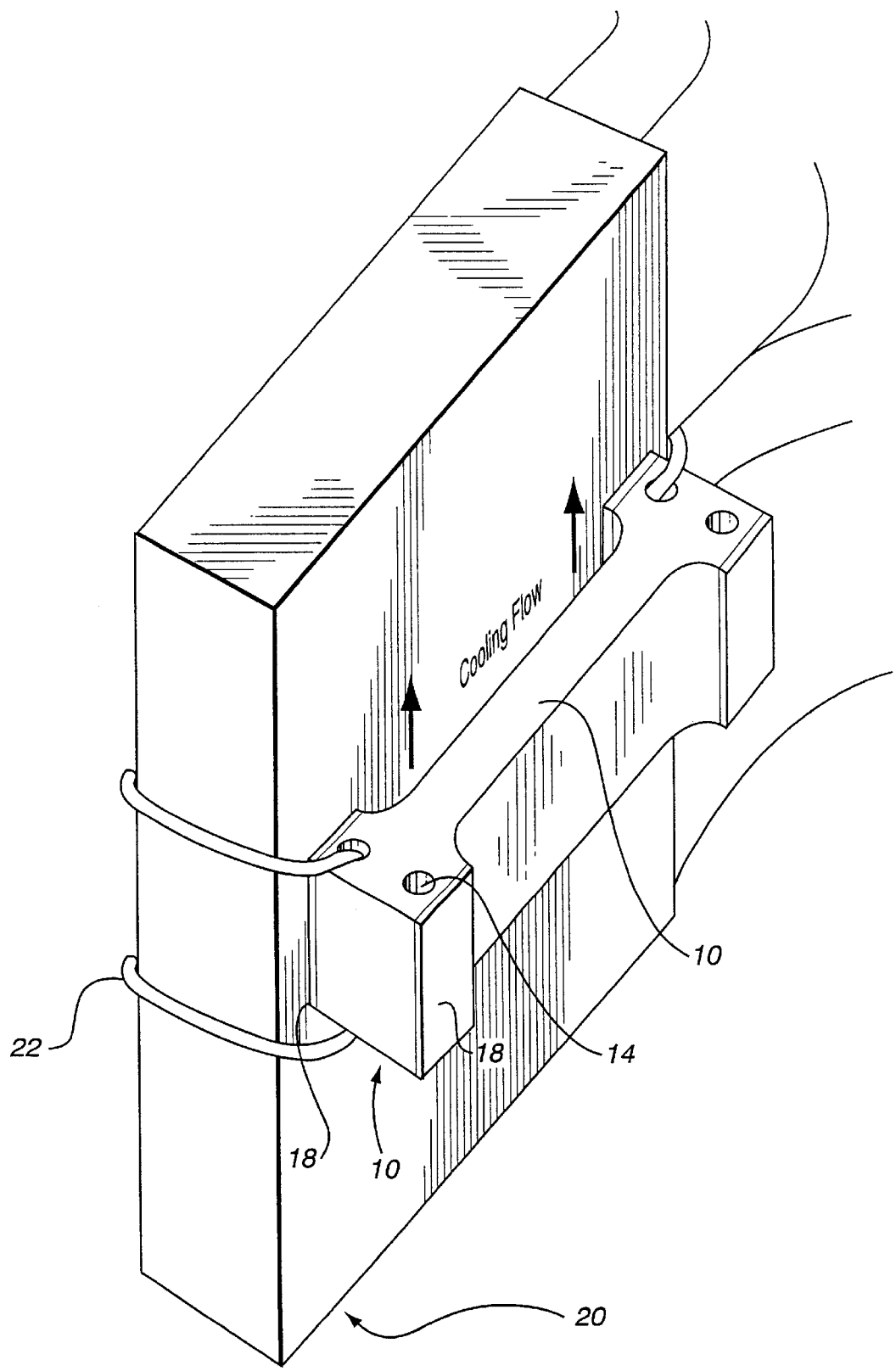
FIG. 5 is a perspective view of the series loop block shown in FIG. 4 assembled with a series loop cap.

As shown in FIGS. 4–5, grooves 12 are machined at each side of series loop block 10. Cooling gas can pass through grooves 12 when block 10 is assembled into an armature end-winding. Tie holes 14, at the ends of block 10, are used to bond block 10 to adjacent series loop caps 20 using glass tape tie cord 22. To better fit the space between two adjacent series loop caps 20, block contacting surfaces 16 of series loop block 10 are made slightly non-parallel since adjacent series loop caps are also non-parallel. A layer of felt 18 is inserted between block contacting surfaces 16 and series loop cap 20, as shown in FIG. 5.

Figure 1:
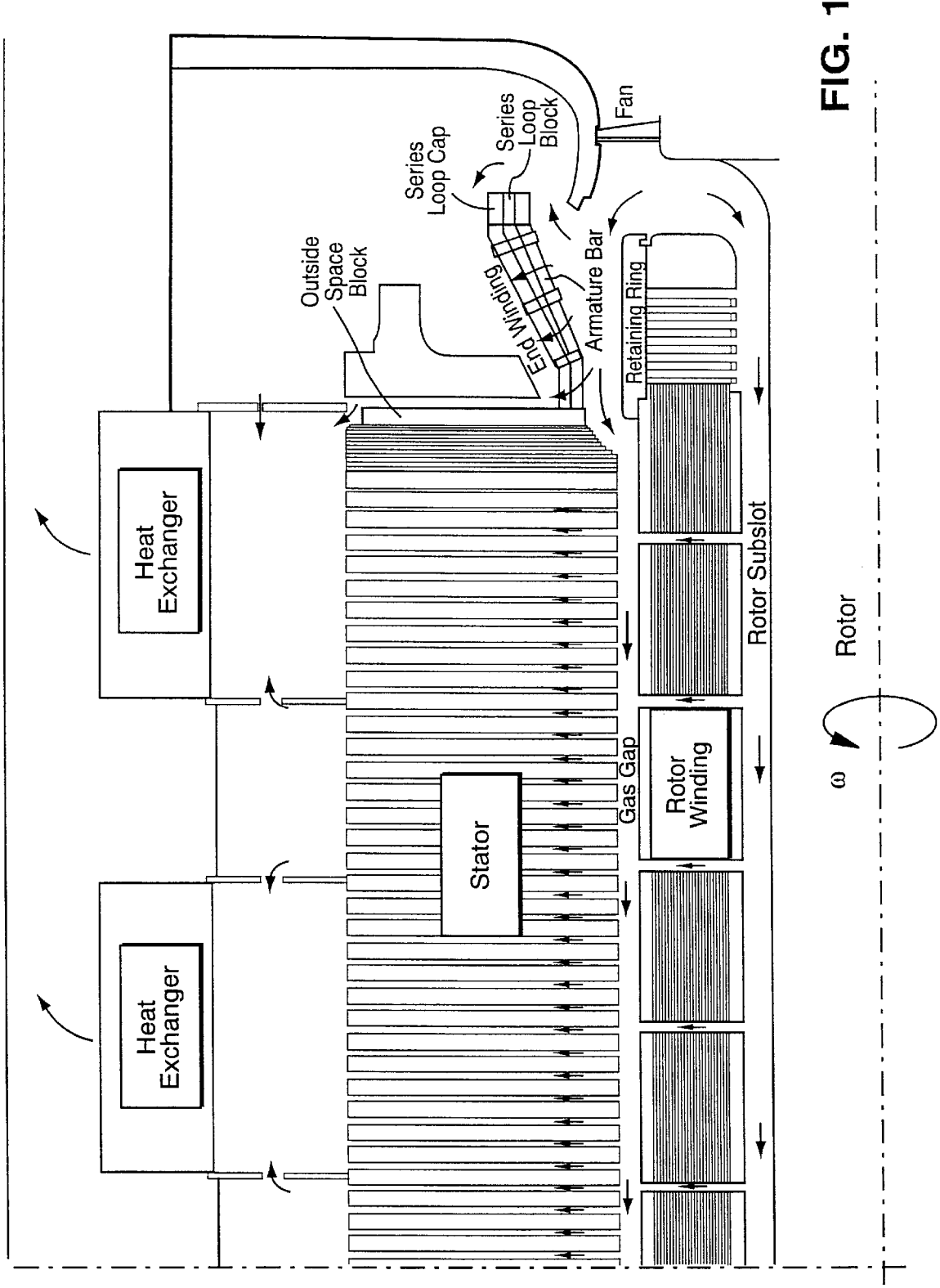
FIG. 1 is a schematic diagram of ventilation flow distribution in a forward flow generator.
Figure 2:
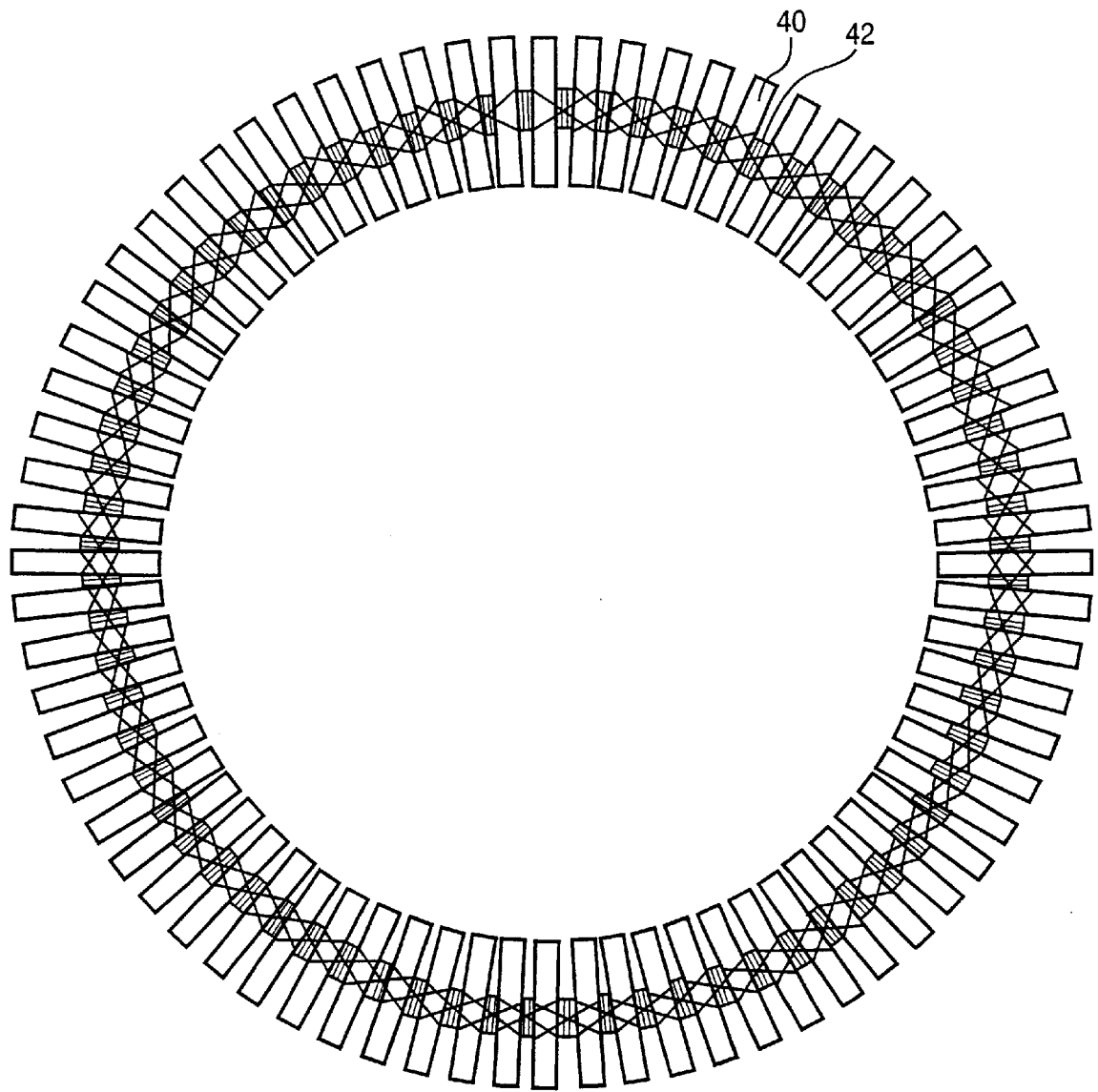
FIG. 2 is a schematic diagram of series loop blocking using X-tie and frap.
Figure 3:
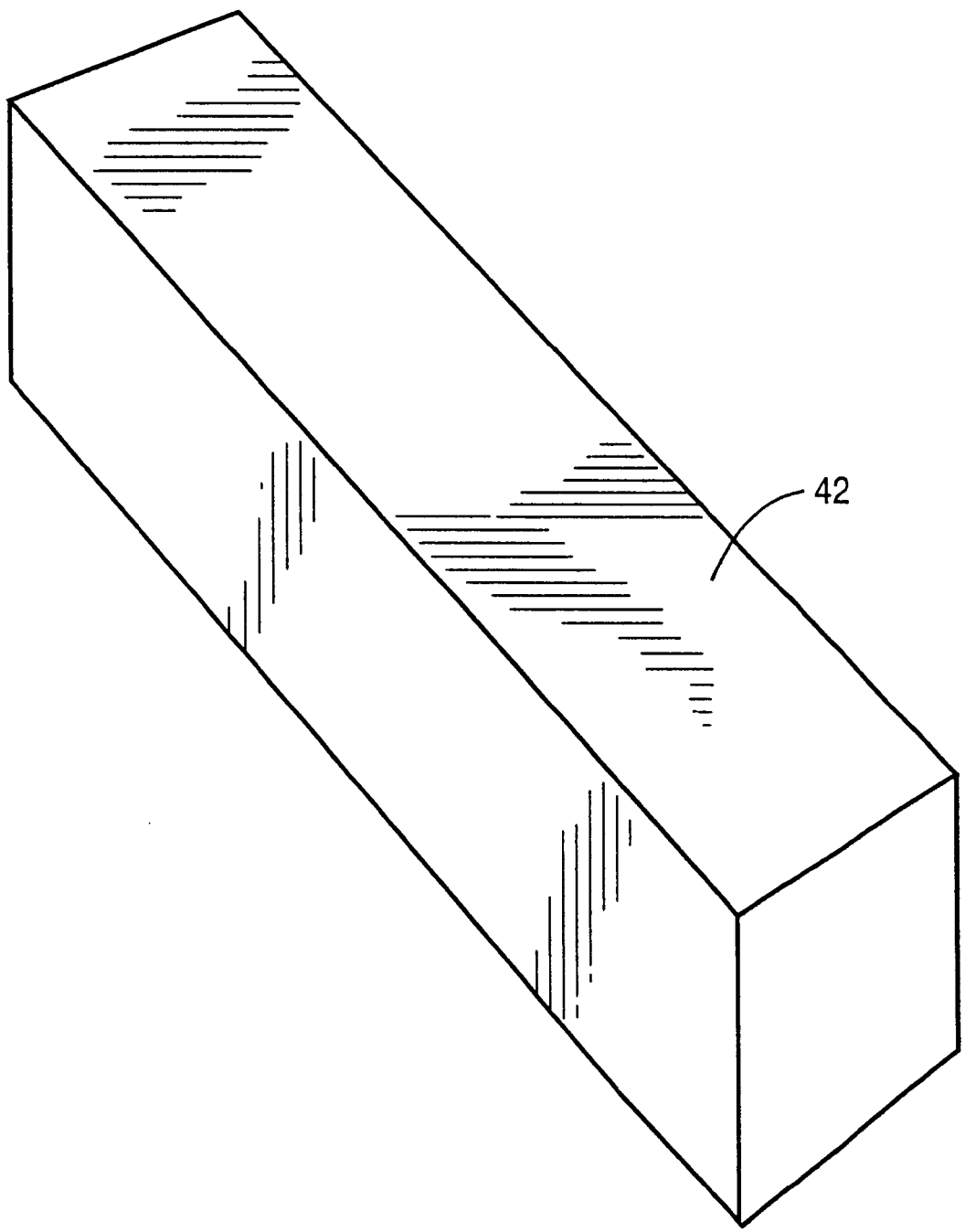
FIG. 3 is a perspective view of a prior art series loop block.

The series loop blocks 10 can be custom fitted to the spaces between series loop caps 20 because the areas of contact are greatly reduced as compared to conventional series loop blocks. The smaller block contacting surfaces 16, located at the ends of blocks 10, facilitate grinding of these surfaces for custom fitting to irregular spaces between series loop caps 20, thus obtaining a tighter fit and improving performance. The conventional solid blocking, shown in FIG. 3, did not easily accommodate large variations in the gap dimensions and instead relied on the build up of felt.

Figure 6:
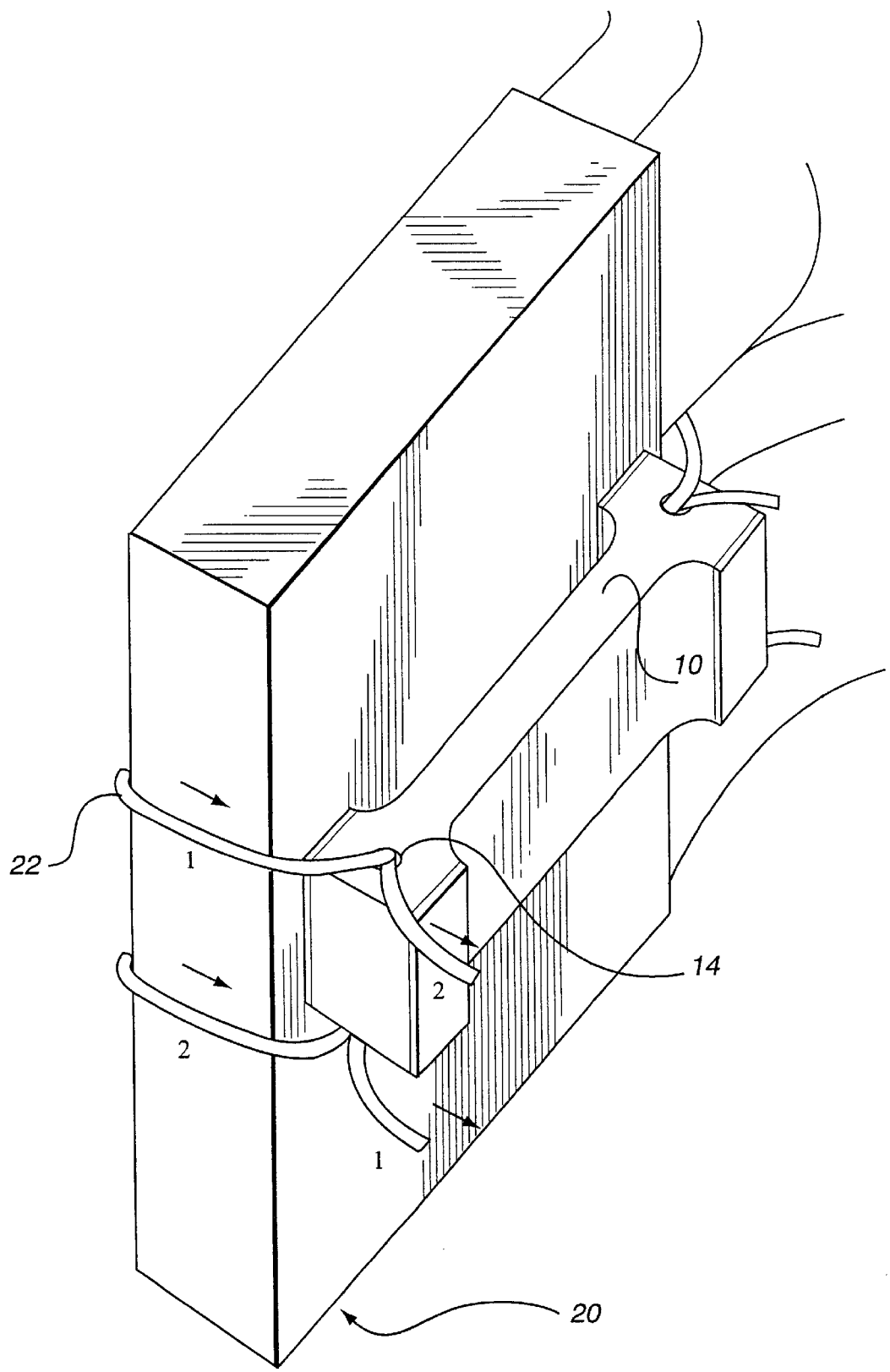
FIG. 6 is a perspective view of another embodiment of the series loop block assembled with a series loop cap.
Figure 7:
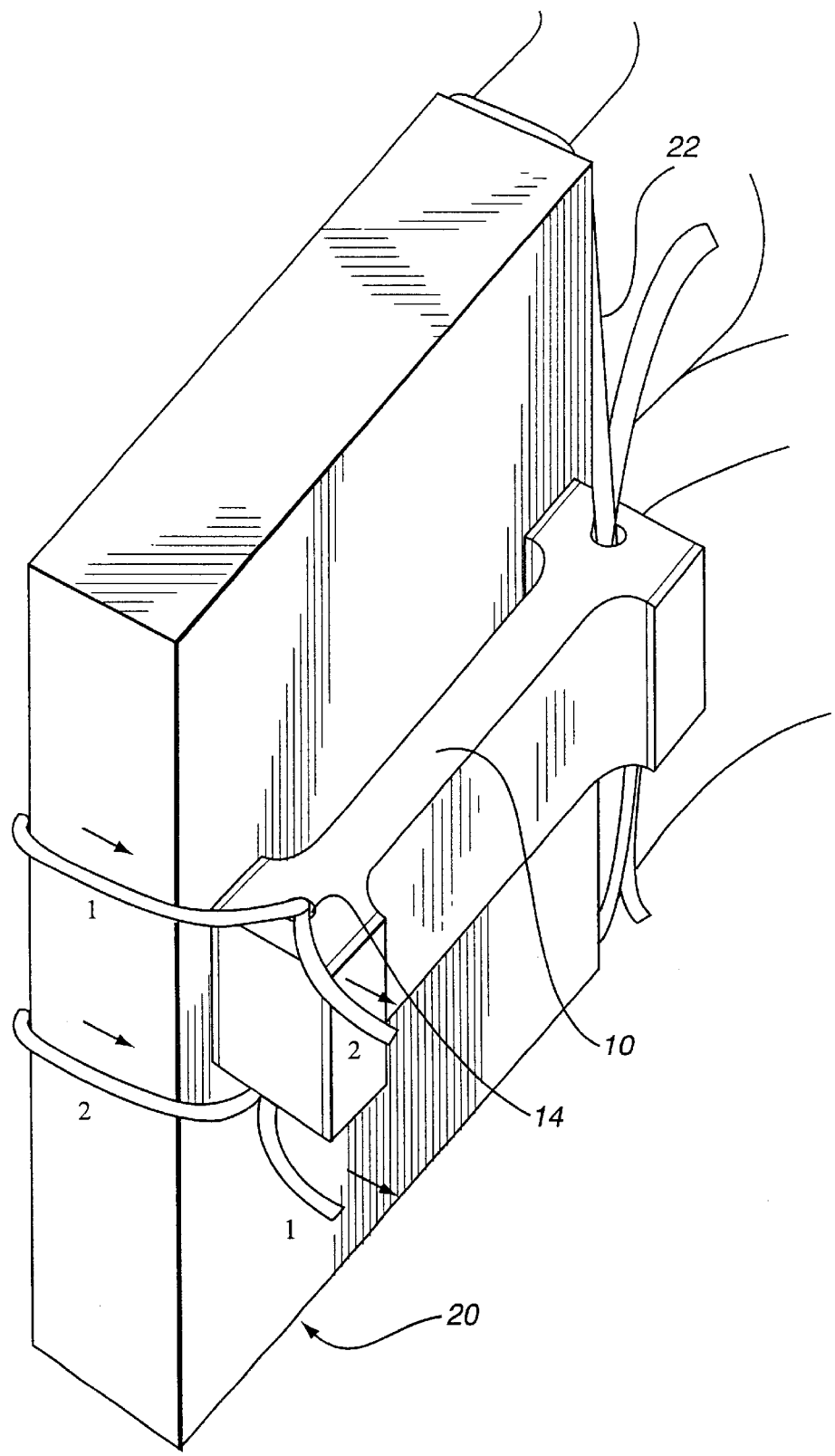
FIG. 7 is a perspective view of the embodiment of the series loop block shown in FIG. 6 assembled in an alternative way with a series loop cap.

Several alternative attachment methods can be applied depending on whether one or two tie holes 14 are located at each block end, as shown in FIGS. 5–7. Generally glass tape tie cord 22 can either thread through tie holes 14 in adjacent blocks 10 (not shown) or wrap around series loop cap 20, as shown in FIG. 5, depending on blocking requirements. With two tie holes 14 at each end of block 10, glass tape tie cord 22 goes through one tie hole 14 at one end of block 10, wraps around loop cap 20, and goes through tie hole 14 at the other end of block 10 to tie block 10 axially with respect to adjacent series loop cap 20, as shown in FIG. 5. In either case, the tie prevents the relative movement of blocks 10 with respect to series loop caps 20. Use of two tie holes 14 in block 10 allows the series loops to be tied independently.

FIG. 6 shows a series loop block 10 with only one tie hole 14 at each end. Ties 22 securing series loop block 10 to adjacent series loop cap 20 use tie holes 14 and, like the two-hole blocks, may be threaded through adjacent blocks (not shown) or wrapped around the cap, as shown in FIG. 6. As shown in FIG. 6 by arrows 1 and 2, tie cord 22 wraps from one end of series loop block 10 around series loop cap 20, and passes downwardly through tie hole 14 at the other end of series loop block 10, as shown by arrows 1, before passing on to an adjacent series loop cap and block (not shown). The looped tie cord 22 then returns to wrap around series loop cap 20 in the direction shown by arrows 2 in FIG. 6. This tie scheme may simplify blocking and reduce the cycle time by allowing multiple blocks to be secured with one tie cord.

A third alternative attachment method is shown in FIG. 7. Ties 22 wrap around the inboard side of series loop caps 20 and also around the front of the caps, thereby restraining the block from moving. This method would be more suited when blocking is required between every series loop cap.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. An armature end-winding structure comprising:
   a plurality of series loop caps;
   a plurality of series loop blocks, each one of said plurality of loop blocks;
     (a) being substantially rectangular in shape and having top, bottom, side and end surfaces;
     (b) having a groove formed along a portion of each of said side surfaces; and
     (c) having a tie hole formed through said top surface to said bottom surface and disposed adjacent to each one of said end surfaces;
   one of said plurality of series loop blocks being disposed between adjacent ones of said plurality of series loop caps; and
   tie cords for securing said plurality of series loop blocks to said plurality of series loop caps via said tie holes.

2. The armature end-winding structure of claim 1, said side surfaces of said plurality of series loop blocks being non-parallel.

3. The armature end-winding of claim 1, having felt disposed between the non-grooved portions of said side surfaces of said plurality of series loop blocks and said plurality of series loop caps.

4. The armature end-winding of claim 1, said tie cords being glass tape tie cords.

5. An armature end-winding structure comprising:
   a plurality of series loop caps;
   a plurality of series loop blocks, each one of said plurality of loop blocks;
     (a) being substantially rectangular in shape and having top, bottom, side and end surfaces;
     (b) having a groove formed along a portion of each of said side surfaces; and
     (c) having two tie holes formed adjacent each one of said end surfaces and through said top surface to said bottom surface;
   one of said plurality of series loop blocks being disposed between adjacent ones of said plurality of series loop caps; and
   tie cords for securing said plurality of series loop blocks to said plurality of series loop caps via said tie holes.

6. The armature end-winding structure of claim 5, said side surfaces of said plurality of series loop blocks being non-parallel.

7. The armature end-winding of claim 5, having felt disposed between the non-grooved portions of said side surfaces of said plurality of series loop blocks and said plurality of series loop caps.

8. The armature end-winding of claim 5, said tie cords being glass tape tie cords.

9. A method of securing the armature end-winding structure of claim 1, comprising the steps of:
   (a) threading said tie cord up through the tie hole adjacent to one end of one of said plurality of series loop blocks;
   (b) wrapping said tie cord around one of said plurality of series loop caps; and
   (c) threading said tie cord down through the tie hole adjacent to the other end of said one of said plurality of series loop blocks.

10. A method of securing the armature end-winding structure of claim 1, comprising the steps of:
    (a) threading said tie cord up through the tie hole adjacent to one end of one of said plurality of series loop blocks;
    (b) wrapping said tie cord around an inboard side of one of said plurality of series loop caps; and
    (c) threading said tie cord back up through the said tie hole adjacent to said one end of one of said plurality of series loop blocks.

11. A method of securing the armature end-winding structure of claim 5, comprising the steps of:
    (a) threading said tie cord up through one of the two tie holes adjacent to one of said plurality of series loop blocks;
    (b) wrapping said tie cord around said one of said plurality of series loop caps;
    (c) threading said tie cord down through the other of the two tie holes adjacent to said one of said plurality of series loop blocks; and
    (d) wrapping said tie cord back around said one of said plurality of series loop caps.

* * * * *